(12) United States Patent
Randler et al.

(10) Patent No.: US 8,077,075 B2
(45) Date of Patent: Dec. 13, 2011

(54) OBJECT VERIFICATION METHOD FOR USE IN RADAR SYSTEMS FOR MOTOR VEHICLES

(75) Inventors: Martin Randler, Stuttgart (DE); Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 11/662,613

(22) PCT Filed: Jul. 20, 2005

(86) PCT No.: PCT/JP2005/053517
§ 371 (c)(1),
(2), (4) Date: Jan. 6, 2009

(87) PCT Pub. No.: WO2006/034894
PCT Pub. Date: Apr. 6, 2006

(65) Prior Publication Data
US 2009/0121915 A1    May 14, 2009

(30) Foreign Application Priority Data

Sep. 29, 2004    (DE) .......................... 10 2004 047 087

(51) Int. Cl.
*G01S 13/93*    (2006.01)
*G01S 13/00*    (2006.01)

(52) U.S. Cl. ............... 342/70; 342/27; 342/28; 342/89; 342/90; 342/104; 342/109; 342/118; 342/128; 342/175; 342/195

(58) Field of Classification Search ............ 342/27, 342/28, 70–72, 175, 192–197, 89, 90, 118–146, 342/165, 173, 174, 104–115; 180/167–169; 701/300, 301, 1, 70, 93, 96
See application file for complete search history.

(56) References Cited

U.S. PATENT DOCUMENTS

| | | | | |
|---|---|---|---|---|
| 5,574,463 A | * | 11/1996 | Shirai et al. ..................... | 342/70 |
| 6,249,243 B1 | * | 6/2001 | Takagi ............................ | 342/70 |
| 6,292,737 B1 | * | 9/2001 | Higashimata et al. .......... | 701/96 |
| 6,356,229 B1 | * | 3/2002 | Schneider ....................... | 342/70 |
| 6,377,205 B1 | * | 4/2002 | Eckersten et al. .............. | 342/90 |
| 6,518,916 B1 | * | 2/2003 | Ashihara et al. ................ | 342/70 |
| 6,567,039 B2 | * | 5/2003 | Shirai et al. .................... | 342/70 |
| 6,577,269 B2 | * | 6/2003 | Woodington et al. ......... | 342/196 |
| 6,583,752 B2 | * | 6/2003 | Samukawa et al. ............ | 342/70 |
| 6,614,387 B1 | * | 9/2003 | Deadman ........................ | 342/70 |

(Continued)

FOREIGN PATENT DOCUMENTS

DE    195 38 309    4/1997

(Continued)

OTHER PUBLICATIONS

Lissel, E. et al.: "Radar Sensor for Car Applications," Proceedings of the Vehicular Technology Conference, Stockholm, Jun. 8, 1994, vol. 1, Conf. 44, pp. 438-442.

(Continued)

*Primary Examiner* — Bernarr Gregory
(74) *Attorney, Agent, or Firm* — Kenyon & Kenyon LLP

(57) ABSTRACT

In an object verification method for use in radar systems for motor vehicles, the distances and relative velocities of located objects are determined on the basis of received radar echoes. The signature of multiple reflections is searched for in the received radar echoes to verify real objects.

10 Claims, 3 Drawing Sheets

U.S. PATENT DOCUMENTS

| | | | |
|---|---|---|---|
| 6,664,918 B2 * | 12/2003 | Paradie et al. | 342/70 |
| 6,684,149 B2 * | 1/2004 | Nakamura et al. | 701/96 |
| 6,765,523 B2 * | 7/2004 | Ono | 342/70 |
| 6,831,595 B2 * | 12/2004 | Isaji | 342/175 |
| 6,999,024 B2 * | 2/2006 | Kumon et al. | 342/70 |
| 7,034,742 B2 * | 4/2006 | Cong et al. | 342/70 |
| 7,053,817 B2 * | 5/2006 | Nakano et al. | 342/90 |
| 7,071,867 B2 * | 7/2006 | Wittenberg et al. | 342/70 |
| 7,119,734 B2 * | 10/2006 | Nakano et al. | 342/70 |
| 2004/0174292 A1 | 9/2004 | Isaji | |

FOREIGN PATENT DOCUMENTS

| | | |
|---|---|---|
| EP | 0 939 322 | 9/1999 |
| EP | 1 522 873 | 4/2005 |

OTHER PUBLICATIONS

Rohling, H. et al.: "Waveform design principles for automotive radar systems" Proceedings of CIE. International Conference on Radar, Oct. 15, 2001, pp. 1-4.

* cited by examiner

OBJECT VERIFICATION METHOD FOR USE IN RADAR SYSTEMS FOR MOTOR VEHICLES

BACKGROUND OF THE INVENTION

1. Field of the Invention

The present invention relates to an object verification method for use in radar systems for motor vehicles, in which the distances and relative velocities of located objects are determined on the basis of received radar echoes.

2. Description of Related Art

In driver assistance systems for motor vehicles, radar systems are used for sensing the surrounding field of traffic, in particular for finding the position of vehicles traveling up ahead and potential obstacles in the near field of one's own vehicle. A typical application example is an ACC system (adaptive cruise control) for automatically controlling the distance to a vehicle in front of one's own vehicle. Moreover, driver assistance systems are being developed, whose primary purpose is to enhance traffic safety. These include automatic collision warning systems or collision avoidance systems, which automatically trigger an emergency braking in response to an imminent collision danger.

When both the distances and the relative velocities of the located objects are to be determined using a radar system, then at least two measured quantities must be derived for each object from the received radar echoes in order to calculate the distance and the relative velocity. When the positions of a plurality of objects are to be found simultaneously, then the problem arises that the measured quantities must be correctly assigned to the respective objects. Incorrect assignments lead to the detection of ghost objects to which no real object corresponds. When working with safety-critical systems, such as collision avoidance systems, such ghost objects must be eliminated in a fail-proof manner, since, otherwise, they would lead to spurious activations, which, in turn, can pose a safety risk.

Methods are known for verifying real objects and for eliminating ghost objects. An example of a radar system widely used in driver assistance systems is a so-called FMCW radar (frequency modulated continuous wave). In this system, the frequency of the transmitted radar signal is modulated in a ramped form, and the received signal is mixed with the signal transmitted at the instant of reception, so that an intermediate frequency signal is obtained, whose frequency corresponds to the difference in the frequency between the transmitted and the received signal. This frequency differential is dependent, on the one hand, on the signal propagation time and, thus, on the distance of the located object and, on the other hand, on the Doppler shift and, thus, on the relative velocity of the object. To uniquely determine the distance and the relative velocity, two measurements are needed, in which different ramp gradients are used. For example, when an operation is performed for a rising and a falling ramp, using the amount following an equal gradient, then the distance-dependent components cancel each other out in the sum of the intermediate frequencies, making it possible for the relative velocity to be determined. If, on the other hand, a subtraction operation is performed to compute the difference between the intermediate frequency signals, then those components which are dependent on the relative velocity are eliminated, and the distance can be calculated. However, if two different objects are located simultaneously, then two intermediate frequencies are obtained per rising and per falling ramp, and two possible pairings are derived for the addition and subtraction operations, so a unique result is not obtained. The "spurious" pairing then corresponds to a ghost object.

This ambiguity can be remedied by modulating the transmitted frequency using a third ramp whose gradient is shifted relative to those of the two other ramps. The intermediate frequency obtained for one single ramp defines a correlation between the distance and the relative velocity. An object is identified as being real when the correlations obtained for the three different ramps are consistent with one another, i.e., form a uniquely solvable system of equations.

However, as the number of simultaneously detected objects increases, there is an increased statistical probability of a system of equations obtained for a ghost object also having a unique solution—within the limits of accuracy. In such a case, it is not possible to eliminate the ghost object using the previously known method.

There are a number of other causes for the occurrence of ghost objects. One common cause is, for example, the so-called "clutter" of fixed target objects which are spaced at intervals along the side of the road, such as guardrail delineators and the like. Such objects can produce superimposed effects, resulting in quasi-randomly produced detections in the individual FMCW ramps. Instance can arise under certain circumstances in which the detections are combined with one another or with the detections of real objects, to form ghost objects.

BRIEF SUMMARY OF THE INVENTION

The present invention provides for a more reliable elimination of ghost objects, in particular in the context of small object distances.

This is achieved in accordance with the present invention in that the signature of multiple reflections is searched for in the received radar echoes.

The signal transmitted by the radar sensor is reflected off of a located object, e.g., off of the back part of a vehicle traveling in front, and a portion of the reflected signal is received by the radar sensor again. However, another portion of this signal is reflected off of the front part of one's own vehicle and propagates back to the object, where it is reflected once again. If the object distance is not too large, the radar sensor senses even this multiply reflected signal at an amplitude higher than the noise level. If this multiply-reflected signal is interpreted as an object, then it is a ghost object. Since the signal has covered the distance to the object and back twice and, as a result of the multiple reflections, has also undergone a Doppler shift twice, then, in relation to the corresponding real object, precisely twice the distance and twice the relative velocity are obtained for the ghost object. Accordingly, in response to higher order multiple reflections, one would obtain ghost objects whose distances and relative velocities are integral multiples of the distances and relative velocities of the real object. This characteristic signature of multiple reflections is utilized in accordance with the present invention in order to verify real objects more reliably.

In this context, one begins with the realization that, when the distance is not too great, a real object must also have a "shadow", i.e., a ghost object created as the result of multiple reflections. However, such a "shadow" exists only for real objects and, typically, not for ghost objects. It is only in exceptional cases, when all objects involved in the faulty combination are located in the near region and have a matching shadow, that the existence of a shadow can also be simulated for the ghost object. In practice, however, such a case is extremely rare.

Although the probability of a ghost object being erroneously interpreted as a real object is relatively low when the conventional method is employed, statistically, the probability of a "shadow" also still existing for this ghost object is even many times lower. Thus, the reliability of the object verification is substantially enhanced in this manner.

Since the ghost objects produced by clutter are predominantly due to superimposed effects and are not associated with multiple reflections, this cause of ghost objects is also largely eliminated.

In driver assistance systems used for collision warning or collision avoidance purposes, as well as in so-called precrash systems used to prepare passive safety systems, such as seatbelt tensioners and airbags, for an imminent collision, an important parameter is the so-called "time to collision" (TTC), i.e., the time that would still elapse until the point of impact with the located object, assuming a constant relative velocity. The shorter the TTC, the greater is the danger of collision. Since in the case of a real object and its "shadow", the distances and the relative velocities have the same mutual integral relationship, the same TTC is obtained for the shadow as it is for the real object. The object verification process may simply be a matter of considering a TTC to be valid precisely when two (or more) objects have the same TTC. Since only the shortest TTC is of importance when evaluating the collision danger, it suffices to check if merely the shortest TTCs correspond for the located objects.

A shadow object differs from the corresponding real object not only by the larger distance and the greater relative velocity, but also by the distinctly smaller amplitude of the received signal. On the basis of this criterion, it is then possible to check-whether the located object having twice the distance and twice the relative velocity is actually a shadow or, however, an autonomously existing real object.

When working with an angularly resolving radar system, the transverse offset of an object, i.e., the position of the object relative to one's own vehicle in the direction normal to the direction of travel, is calculated from the distance and the measured azimuth angle. Thus, the differential between the real object and its shadow also makes it possible to use the correct distance as a basis for calculating the transverse offset of the real object.

DETAILED DESCRIPTION OF THE INVENTION

Figure 1:
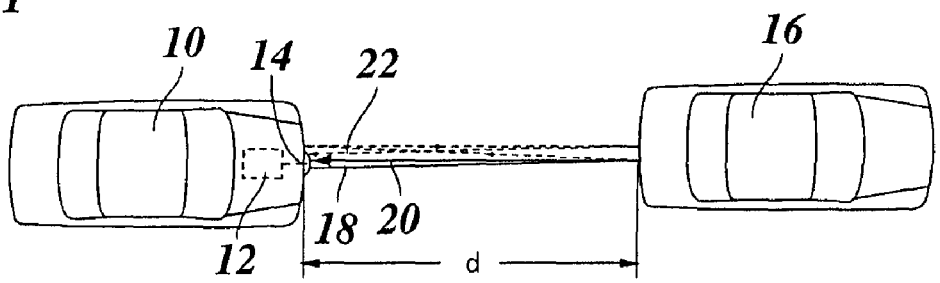
FIG. 1 shows a schematic illustration of the operating principle of a radar system on a motor vehicle.

FIG. 1 schematically depicts a vehicle 10 which is equipped with a driver assistance system 12, e.g., a collision avoidance system, and an associated radar system. Of the radar system, merely a radar sensor 14 is shown, which is installed at the front of the vehicle in order to find the position of objects in the near field of vehicle 10. As an example of such an object, another vehicle 16 is shown.

Radar sensor 14 transmits a signal 18, which, for example, has a frequency on the order of 77 GHz, and which propagates in the forward direction in the form of a cone. Once it has covered a distance corresponding to distance d of the vehicles, signal 18 is reflected off of the back part of vehicle 16 and, in the process, undergoes a Doppler shift which is dependent on the relative velocity of the two vehicles. Reflected signal 20 propagates back towards radar sensor 14 where it is received. However, a portion of reflected signal 20 does not impinge again on radar sensor 14, but is reflected once again off of the front part of vehicle 10, as indicated in FIG. 1 by dashed arrows. This signal is reflected once again off of vehicle 16 and then enters radar sensor 14 partially and at a reduced amplitude, as a multiply-reflected signal 22. Altogether, multiply-reflected signal 22 has covered path $4d$, while singly-reflected signal 20 has only covered path $2d$. Moreover, when reflected a second time off of vehicle 16, multiply-reflected signal 22 undergoes a Doppler shift once again. Thus, this signal represents a ghost object, a quasi shadow of vehicle 16, having twice the distance and twice the relative velocity.

In the following, the evaluation of the merely singly reflected signal 20 will first be explained using an FMCW radar as an example.

Figure 2:
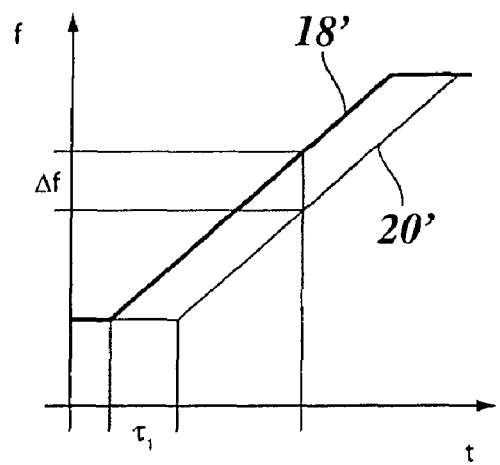
FIGS. 2 and 3 show frequency/time diagrams for signals transmitted and received, respectively, by an FMCW radar.

In FIG. 2, a curve 18' indicates frequency f of transmitted signal 18 as function of time t. This frequency is modulated in a ramped form. A curve 20' indicates the frequency of received signal 20 for the case that vehicle 16 has relative velocity v=0, thus its absolute velocity is equal to that of vehicle 10. Thus, no Doppler shift occurs, and curve 20' is displaced relative to curve 18 on the time axis by a propagation time $\Gamma_1$, in which the radar signal has covered path $2d$ ($\Gamma_1=2d/c$; c being the speed of light). In radar sensor 14, the received signal (curve 20') is mixed with the signal transmitted at the instant of reception (curve 18'). Thus, one obtains an intermediate frequency signal whose frequency $\Delta f$ corresponds to the difference between the transmitted and the received frequency. For the duration of the frequency ramp, $\Delta f$ is essentially constant and proportional to $\Gamma_1$ as well as to ramp gradient m.

Figure 3:
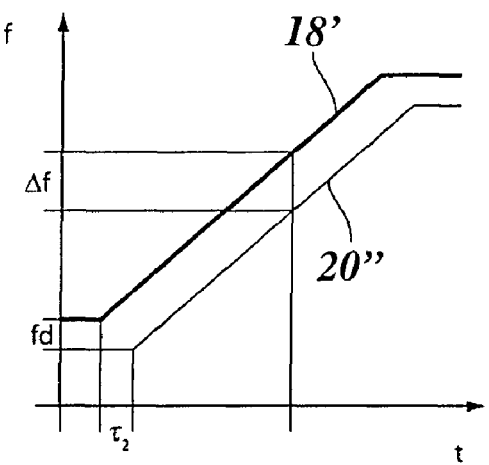

FIG. 3 shows the same diagram as FIG. 2 for the case that vehicle 16 has a smaller distance, and, accordingly, a shorter propagation time $\Gamma_2$, however a positive relative velocity, thus, it is moving away from vehicle 10. Thus, the received signal, which is represented here by a curve 20", exhibits a negative Doppler shift fd. In the illustrated example, the relationship between distance and relative velocity is precisely such that the Doppler shift is exactly compensated by the smaller distance, so that the intermediate frequency signal has the same frequency $\Delta f$ as in FIG. 2. Thus, the distance and the relative velocity are not able to be uniquely determined from frequency $\Delta f$, rather a defined relationship between these variables is merely established.

Figure 4:
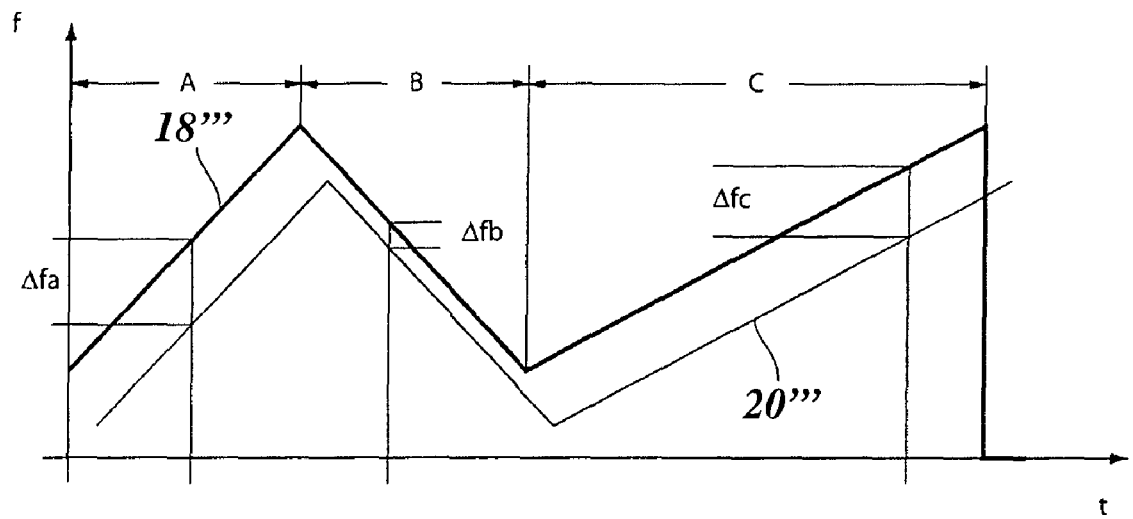
FIG. 4 illustrates an example of an FMCW signal having three frequency ramps.

FIG. 4 illustrates a way to remedy this ambiguity. The transmitted signal, represented here by a curve 18''' is modulated during each measuring cycle of radar sensor 14 in three different frequency ramps, namely one rising ramp A, one falling ramp B of the same duration and having an equal and opposite gradient, and, once again, in a rising ramp C, which has twice the duration, but only half the gradient. Curve 20''' in FIG. 4 indicates the frequency of the received signal which is influenced by the propagation time and the Doppler shift.

On rising ramp A, the propagation time and the Doppler shift have an additive effect, namely both have the effect of increasing an intermediate frequency Δfa. On the other hand, on falling ramp B, the intermediate frequency signal has value Δfb, which is given by the difference between the propagation time-dependent frequency shift and the Doppler shift, and the propagation time-dependent frequency shift has the opposite algebraic sign as ramp A. The sum Δfa+Δfb is only dependent on the Doppler shift and thus permits a calculation of the relative velocity. On the other hand, the difference Δfa−Δfb is only dependent on the propagation time and thus permits a calculation of distance d. Thus when only one single object is present, the distance and the relative velocity may be uniquely determined. The third ramp C is required when two or more objects are located simultaneously. This is explained in greater detail in the following with reference to FIGS. 5 and 6.

The intermediate frequency signals obtained for the three ramps A, B and C are digitized and plotted as functions of the time. A fast Fourier transform is then performed on these functions, separately for each ramp, in order to form the corresponding frequency spectra. In these spectra, each located object emerges in the form of a peak at a specific frequency Δf.

Figure 5:
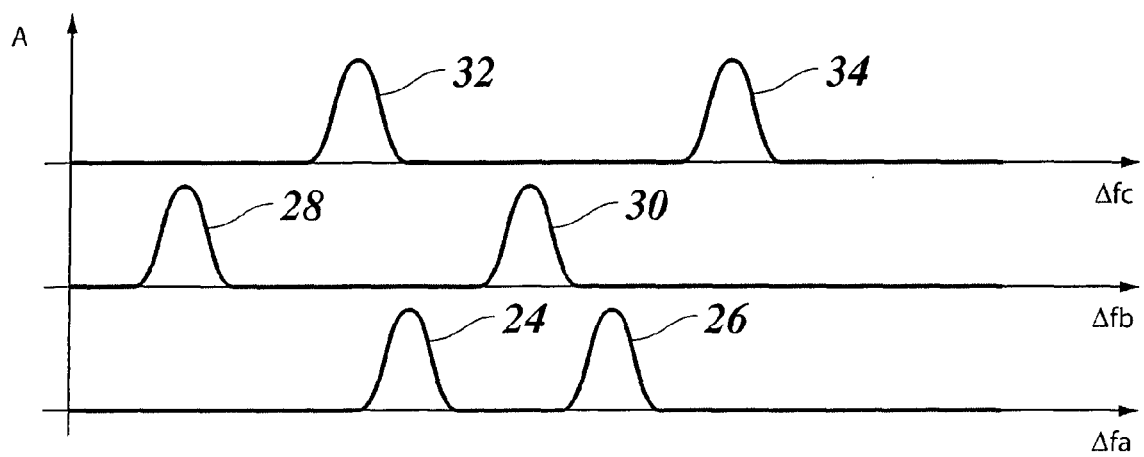
FIG. 5 illustrates spectra of intermediate frequency signals for two objects and for the three frequency ramps shown in FIG. 4.
Figure 6:
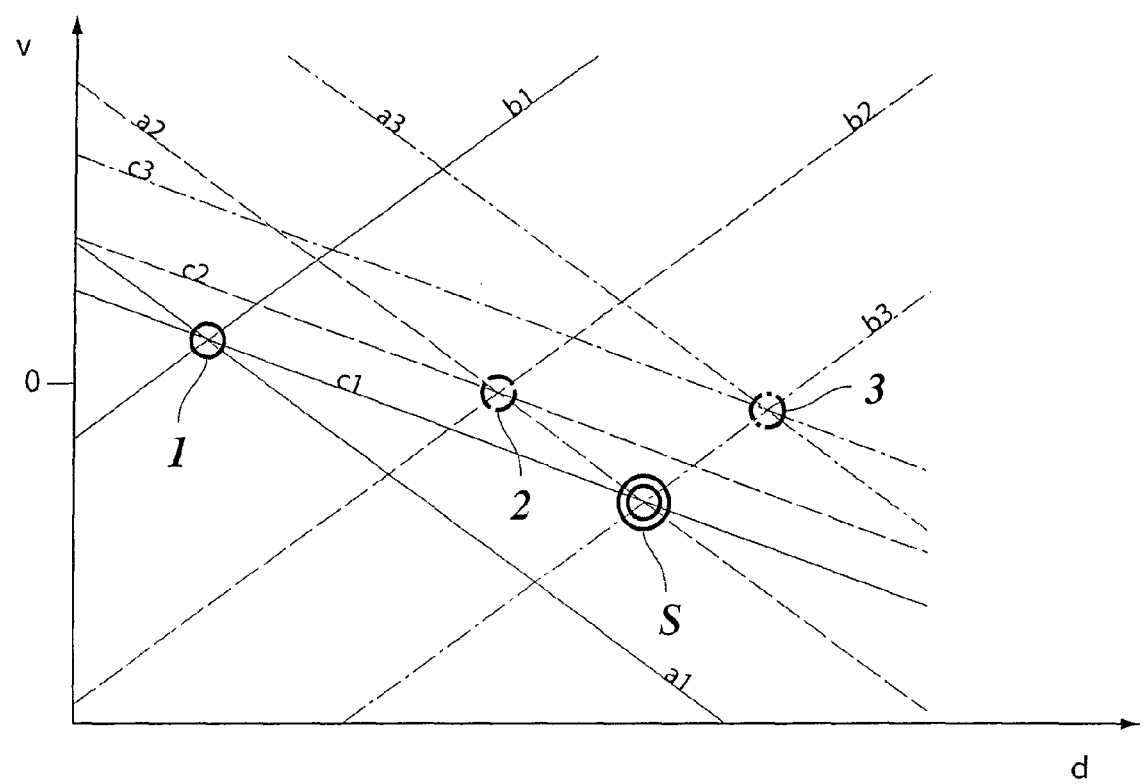
FIG. 6 shows a relative velocity/distance diagram for illustrating the formation of ghost objects when working with a FMCW radar.

FIG. 5 shows exemplarily the spectra recorded for the three ramps, i.e., the amplitudes as a function of frequency Δfa, Δfb and, respectively, Δfc, for the case that two objects are detected simultaneously. Thus, for ramp A, one obtains two peaks 24, 26; for ramp B, two peaks 28, 30; and for ramp C, two peaks 32, 34. However, it is not clear from the outset, which peaks belong to which of the two objects. However, the apex or the center of mass of each peak indicates a frequency value which defines the mentioned relationship between distance d and relative velocity v for the object in question. Thus, one obtains altogether six different relations which may be represented as straight lines in a v-d diagram in accordance with FIG. 6. Thus, in FIG. 6 for example, for four peaks on ramps A and B, one obtains straight lines a1, a2, b1 and b2. The two corresponding objects may lie either on the points of intersection of a1 with b1 and a2 with b2, or on the points of intersection of a1 with b2 and a2 with b1. However, if one includes the two peaks for third ramp C, then one obtains two other straight lines c1 and c2, and each of the two objects must also lie on one of these straight lines. Thus, the two objects 1 and 2 in FIG. 6 are each uniquely identified by the points of intersection of three straight lines, and their distances and relative velocities may be read off directly from the diagram.

At this point, the assumption is made in the following that, in addition to the two objects 1 and 2 in FIG. 6, a third object 3 is also located, so that there would be an additional peak in each of the three spectra in FIG. 5. These additional peaks define three additional straight lines a3, b3 and c3, which, in turn, intersect at one point and thus identify object 3. However, straight line b3 now passes randomly through the point of intersection of two straight lines a2 and c1, so that the possible existence of an object S at the point of intersection of these three straight lines is simulated. Without any additional information, it is not possible to conclude in this case which of the objects 1, 2, 3 and S is real and which is only a ghost object. In the illustrated example, object S is the only object having a negative relative velocity, i.e., its distance to vehicle 10 is decreasing, so that this object poses the greatest danger of imminent collision. Since it cannot be ruled out that this is a real object, and since the worst case scenario must always be assumed in a collision avoidance system, a collision warning would possibly have to be output in this case. The result would be a false warning.

In the method according to the present invention for verifying objects, such false warnings are avoided in that real objects are additionally verified on the basis of the multiple reflections (FIG. 1).

Figure 7:
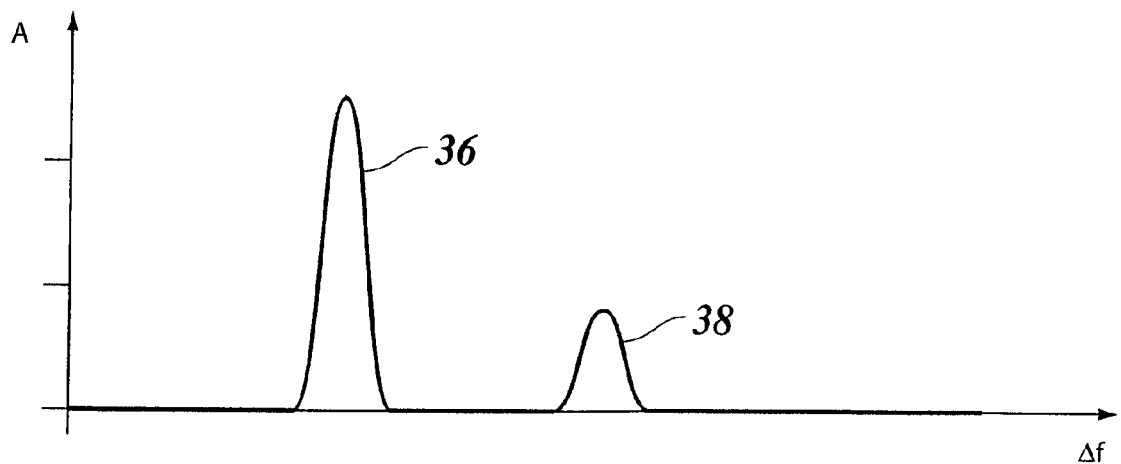
FIG. 7 illustrates a spectrum of an intermediate frequency signal for a real object and for its shadow formed by multiple reflection.

FIG. 7 shows a spectrum that is analogous to one of the spectra in FIG. 5, however only for one ramp and for only one single object. This object leaves behind a distinctly salient peak 36 in the spectrum and, additionally, a much weaker peak 38 that is produced by the multiply reflected signal 22 in FIG. 1. Generally, in the object detection process, only those peaks are evaluated in the spectra which are sufficiently prominent above the noise level and whose peak values thus lie above a defined threshold value. In known methods heretofore, the peaks caused by multiple reflections were treated as noise signals, and the threshold value was selected to be high enough to exclude these peaks from the evaluation. In the method according to the present invention, however, the evaluation threshold is lowered to the point where the peaks caused by multiple reflections, such as peak 38, may also be recognized as potential objects.

When the distance and the relative velocity for peak 38 have been determined using the procedure described above with reference to FIG. 2 through 6, then, for the distance, one obtains precisely twice the distance that one had obtained for peak 36, and one also obtains precisely twice the value for the relative velocity. In this manner, peak 38 is to be identified as a shadow which is conditional upon multiple reflection and which belongs to the real object that produced peak 36.

Every object whose distance d is smaller than a defined threshold value $d_{TH}$ leaves behind a perceptable shadow peak in the spectrum. The greater the transmitting capacity of radar sensor 14, the greater is threshold value $d_{TH}$. On the other hand, for ghost objects such as object S in FIG. 6, there is no shadow peak even at a small object distance. Thus, the absence of a shadow peak makes it possible to eliminate an object as a ghost object, or, conversely, the presence of a shadow peak makes it possible to verify a real object.

Figure 8:
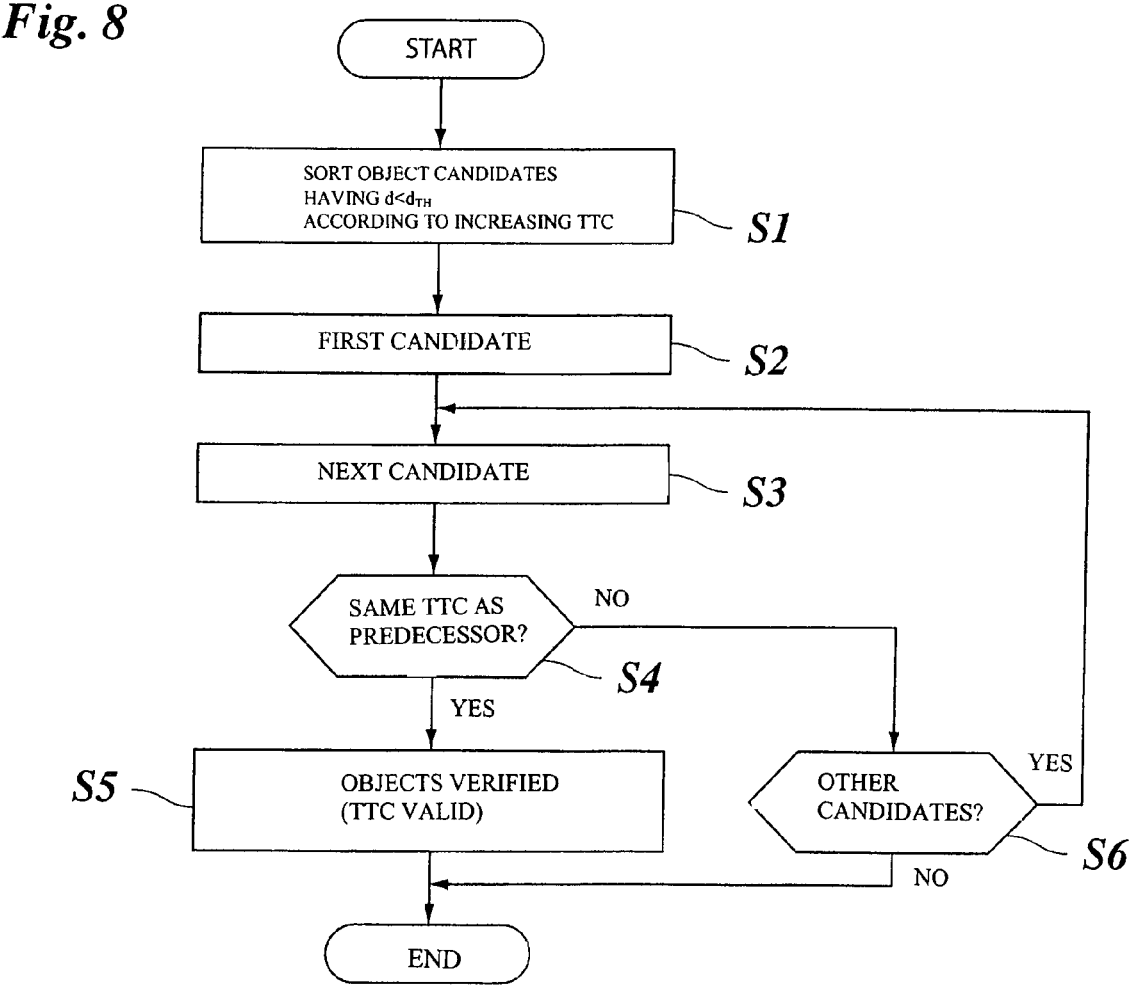
FIG. 8 shows a flow chart of the method for verifying objects according to the present invention.

FIG. 8 shows exemplarily a flow chart of a procedure that is implemented in driver assistance system 12 and is used in that system for verifying objects. The simple example is assumed here that the essential function of driver assistance system 12 is to generate a collision warning signal or an emergency braking command in response to detection of an object that poses an acute collision danger. As a measure of the collision danger, the "time to collision" TTC is used, thus the time that would still elapse until the point of collision, assuming an unchanged relative velocity of the object. Thus, for an object at distance d having (negative) relative velocity v, it holds that TTC=−d/v. If a TTC which lies below a defined threshold value is obtained for at least one object and the associated object has been verified as a real object, a collision warning or a braking command is output.

The procedure illustrated in FIG. 8 is invoked when, in a given measuring cycle of the radar sensor, the distances and relative velocities of the objects were determined (as in FIG. 6), as the case may be, including ghost objects that cannot be eliminated. In the example described here, the procedure is only invoked when the number of potential objects, including the ghost objects, is greater than the object number that is given by the number of peaks in each spectrum (FIG. 5).

The object verification process which makes use of multiple reflections may only be carried out for potential objects whose distance d is smaller than $d_{TH}$. This limitation is acceptable, since, generally, objects having a greater distance do not pose any imminent collision danger. Should the unusual exception nevertheless occur, the object is then verified at the latest when the distance has fallen below $d_{TH}$. By selecting an appropriate capacity for radar sensor 10, a $d_{TH}$ may be achieved that is high enough to ensure that one's own vehicle 10 is braked in time, making it possible to avert a collision.

Generally, objects, whose distance is greater than $d_{TH}$, will also not lead to a collision warning, so that the danger of false warnings is also not substantially increased when such objects are not eliminated as ghost objects, but rather are treated as real objects. Therefore, the need is eliminated in the illustrated example for an additional verification of these objects.

In step S1, times TTC are calculated for those object candidates which fulfill the mentioned distance condition $d<d_{TH}$, and the candidates are sorted in a list in the order of increasing TTC. In step S2, the first candidate is then retrieved from the list, thus the object having the shortest TTC. A loop then begins in step S3, in which the following candidates are retrieved one after another. In step S4, it is checked whether the newly retrieved candidate has the same TTC as its predecessor, within certain limits of accuracy. This condition is met when both candidates are constituted of one real object and its shadow that is produced by multiple reflection, since factor 2 cancels itself out in the measured distances and relative velocities in the calculation of TTC. Thus, in this case, the object having the smaller distance (and the larger amplitude) is verified as being a real object, and, in any case, the matching TTC is to be considered as a valid value, which is then transmitted by the object verification procedure back to the main program, and an appropriate system reaction is triggered (step S5).

When, in step S4, the TTCs for the two candidates under consideration do not correspond, the first of these two candidates may then be rejected as being a ghost object. It is then checked in step S6 whether there are still other candidates in the list. If this is the case, the method returns to step S3, where the next candidate is retrieved and a next pass through the loop begins. Thus, two candidates, which immediately follow one another in the list, are compared each time in step S4. In the process, as soon as two corresponding TTCs are found, the loop is exited at S5, and the procedure is terminated. The list may, in fact, still include other real objects, however, their TTCs are not relevant, since they are longer, at any rate, than the valid TTC that was found. If, in step S6, no further candidates are present in the list, the procedure is ended, without any valid TTC being found.

In the described example, the characteristic signature for multiple reflections lies in the real object and its shadow having the same TTC. Optionally, the somewhat stricter condition may also be applied, stipulating a shadow having twice the relative velocity and twice the distance as the real object.

What is claimed is:

1. A method for object verification for use in radar systems for a controlled motor vehicle, comprising:
   transmitting a radar signal from the controlled motor vehicle;
   determining, based on radar echoes received at the controlled motor vehicle, a relative distance and a relative velocity between the controlled motor vehicle and each one of a plurality of located potential objects; and
   analyzing the determined relative distances and relative velocities to identify a characteristic signature indicating multiple reflections of the radar signal between the controlled motor vehicle and at least one of the plurality of located potential objects, wherein the characteristic signature is used for object verification.

2. The method as recited in claim 1, wherein the characteristic signature is defined by an agreement of a predefined quotient for each of two simultaneously determined potential objects, wherein the predefined quotient for each potential object is a quotient of the determined relative velocity to the determined relative distance.

3. The method as recited in claim 2, wherein the characteristic signature is defined by simultaneously satisfying the following conditions for two simultaneously determined potential objects: a) the determined relative distance of a first potential object is a first integral multiple of the determined relative distance of a second potential object; and b) the determined relative velocity of the first potential object is the first integral multiple of the determined relative velocity of the second potential object.

4. The method as recited in claim 2, wherein the use of the characteristic signature for object verification is limited to potential objects having relative distances to the controlled motor vehicle smaller than a predefined threshold distance, wherein the predefined threshold distance is selected in such a way that, for potential objects having relative distances to the controlled motor vehicle smaller than the predefined threshold distance, at least a first order multiple reflections of the radar signal result in a detectable signal.

5. The method as recited in claim 1, wherein, based on the received radar echoes, at least three mutually independent relations between the relative velocity and the relative distance are derived for each located potential object, and wherein object verification by using the characteristic signature indicating multiple reflections is performed only for located potential objects for which the at least three mutually independent relations are consistent with one another.

6. The method as recited in claim 5, wherein object verification by using the characteristic signature indicating multiple reflections is performed only if the number of pairs of the relative distance and the relative velocity that fulfill the at least three mutually independent relations in a consistent manner, is greater than the number of located potential objects.

7. A driver assistance system for a motor vehicle, comprising:
   a unit for transmitting a radar signal from the controlled motor vehicle;
   an arrangement for determining, based on radar echoes received at the controlled motor vehicle, a relative distance and a relative velocity between the controlled motor vehicle and each one of a plurality of located potential objects; and
   an arrangement for analyzing the determined relative distances and relative velocities to identify a characteristic signature indicating multiple reflections of the radar signal between the controlled motor vehicle and at least one of the plurality of located potential objects, wherein the characteristic signature is used for object verification.

8. The driver assistance system as recited in claim 7, wherein the driver assistance system is configured to trigger at least one of a warning function and a safety function on the basis of the determined relative distances and the determined relative velocities of the located potential objects that are verified as real objects, and on the basis of at least one criterion that is indicative of a collision danger.

9. The driver assistance system as recited in claim 8, wherein a smallest quotient of the determined relative distance and the determined relative velocity for the located potential objects that are verified as real objects is determined, and wherein, on the basis of a predetermined criterion for the determined smallest quotient, the at least one of the warning function and the safety function is triggered.

10. The driver assistance system as recited in claim 8, wherein the unit for transmitting the radar signal is a frequency modulated continuous wave (FMCW) radar.

* * * * *